(12) United States Patent
Hosokawa

(10) Patent No.: US 7,701,967 B2
(45) Date of Patent: Apr. 20, 2010

(54) COMMUNICATION CONTROL TERMINAL APPARATUS, AND STORAGE MEDIUM

(75) Inventor: Yuko Hosokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1272 days.

(21) Appl. No.: 10/241,705

(22) Filed: Sep. 12, 2002

(65) Prior Publication Data

US 2003/0053483 A1    Mar. 20, 2003

(30) Foreign Application Priority Data

Sep. 14, 2001    (JP) ............................. 2001-278967

(51) Int. Cl.
*H04J 3/16*    (2006.01)
(52) U.S. Cl. ...................... 370/466; 370/412; 370/428; 370/429; 370/464; 379/88.13; 379/93.05; 358/1.13; 358/1.15; 358/442; 358/443
(58) Field of Classification Search ................ 370/412, 370/428, 429, 464, 466; 379/88.13–88.28, 379/93.05–93.09, 93.31, 100.12; 358/1.13, 358/1.15, 442, 443

See application file for complete search history.

(56) References Cited

U.S. PATENT DOCUMENTS

| | | | |
|---|---|---|---|
| 4,887,164 A * | 12/1989 | Takahashi ................... | 358/443 |
| 5,196,945 A * | 3/1993 | Ho et al. ................. | 358/426.02 |
| 5,946,107 A * | 8/1999 | Morisaki ..................... | 358/444 |
| 6,061,149 A | 5/2000 | Hosokawa et al. ......... | 358/442 |
| 6,064,489 A * | 5/2000 | Nosaki et al. .............. | 358/1.13 |
| 6,067,172 A * | 5/2000 | Yokoyama .................. | 358/442 |
| 6,965,446 B2 * | 11/2005 | Wakabayashi ............. | 358/1.15 |
| 2002/0051146 A1 * | 5/2002 | Tanimoto .................... | 358/1.9 |

FOREIGN PATENT DOCUMENTS

JP    2001-148788    5/2001

* cited by examiner

*Primary Examiner*—William Trost, IV
*Assistant Examiner*—Toan D Nguyen
(74) *Attorney, Agent, or Firm*—Fitzpatrick, Cella, Harper & Scinto

(57) ABSTRACT

A communication control terminal apparatus employs one CPU to control two or more communication procedures, without adversely affecting each other. The communication control terminal apparatus includes a storage unit for storing information by using predetermined codes, a codec unit for coding and decoding the information, and communication control units for transmitting the information. A communication code obtained by the codec unit through conversion is transmitted via the communication control units. An execution time for the codec unit is changed in accordance with types of the communication procedures performed by the communication control units.

11 Claims, 12 Drawing Sheets

FIG. 2

| | |
|---|---|
| STEP OF EXCHANGING MESSAGE BETWEEN CONTROL UNITS | 801 |
| STEP OF ANALYZING MESSAGE | 802 |
| STEP OF CHECKING BUSY CONDITION OF LINE | 803 |
| STEP OF CHANGING OVER BUSY CONDITION OF LINE | 804 |
| STEP OF NOTIFYING LINE CONTROL UNIT OF PROCESS REQUEST | 805 |
| STEP OF REGISTERING codec_timer | 806 |

| | |
|---|---|
| STEP OF COMMUNICATING VIA PSTN LINE | 811 |
| STEP OF COMMUNICATING VIA ISDN LINE | 812 |
| STEP OF COMMUNICATING VIA LAN | 813 |
| STEP OF ANALYZING COMM QUEUE | 814 |
| STEP OF NOTIFYING CODEC OF PROCESS REQUEST | 815 |
| STEP OF ANALYZING PROCESS RESULT FROM CODEC | 816 |
| STEP OF NOTIFYING COMM RESULT | 817 |

| | |
|---|---|
| STEP OF ANALYZING COMM MODE | 821 |
| STEP OF SETTING TIMER BASED ON COMM MODE ANALYSIS RESULT | 822 |
| STEP OF DECIDING IF TIMER TIMES OUT OR NOT | 823 |
| STEP OF DECODING DATA | 824 |
| STEP OF JUDGING DECODING RESULT | 825 |
| STEP OF ENCODING DATA | 826 |
| STEP OF JUDGING CODING RESULT | 827 |
| STEP OF CHANGING OVER JOB QUEUE BASED ON RESULT OF DECISION ON TIME-OUT OF TIMER | 828 |
| STEP OF NOTIFYING COMM CONTROL UNIT OF PROCESS RESULT | 829 |
| STEP OF DECODING DATA | 830 |
| STEP OF DECODING DATA | 831 |
| | 832 |

FIG. 3A

PSTN LINE MANAGEMENT PARAMETERS

| | |
|---|---|
| 611 — pstn_use_flg | — ON=ON PSTN COMM |
| 612 — path_id | — PATH ID |

FIG. 3B

NETWORK LINE MANAGEMENT PARAMETERS

| | |
|---|---|
| 621 — ifax_use_flg | — ON=ON iFAX COMM |
| 622 — path_id | — PATH ID |

FIG. 3C

1ST ISDN LINE MANAGEMENT PARAMETERS 1

| | |
|---|---|
| 631 — isdn1_use_flg | — ON=ON ISDN COMM |
| 632 — path_id | — PATH ID |

FIG. 3D

2ND ISDN LINE MANAGEMENT PARAMETERS

| | |
|---|---|
| 641 — isdn2_use_flg | — ON=ON ISDN COMM |
| 642 — path_id | — PATH ID |

FIG. 3E

MANAGEMENT TABLE FOR PATH ID

| | |
|---|---|
| 651 — path_id [0] | — pstn/isdn1/isdn2/ |
| 652 — path_id [1] | ifax/NOT OCCUPIED |
| 653 — path_id [2] | |
| 654 — path_id [3] | |

FIG. 3F

CALLING QUEUE MANAGEMENT DIAGRAM

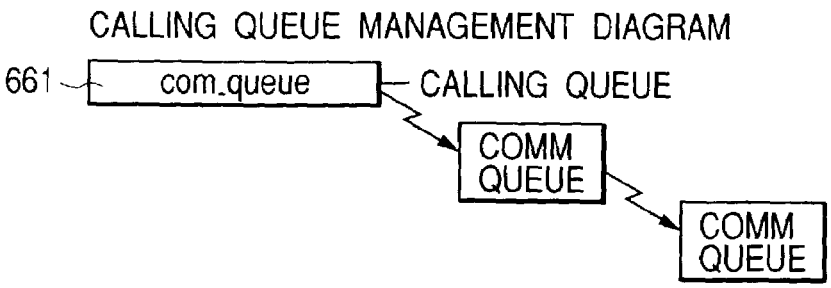

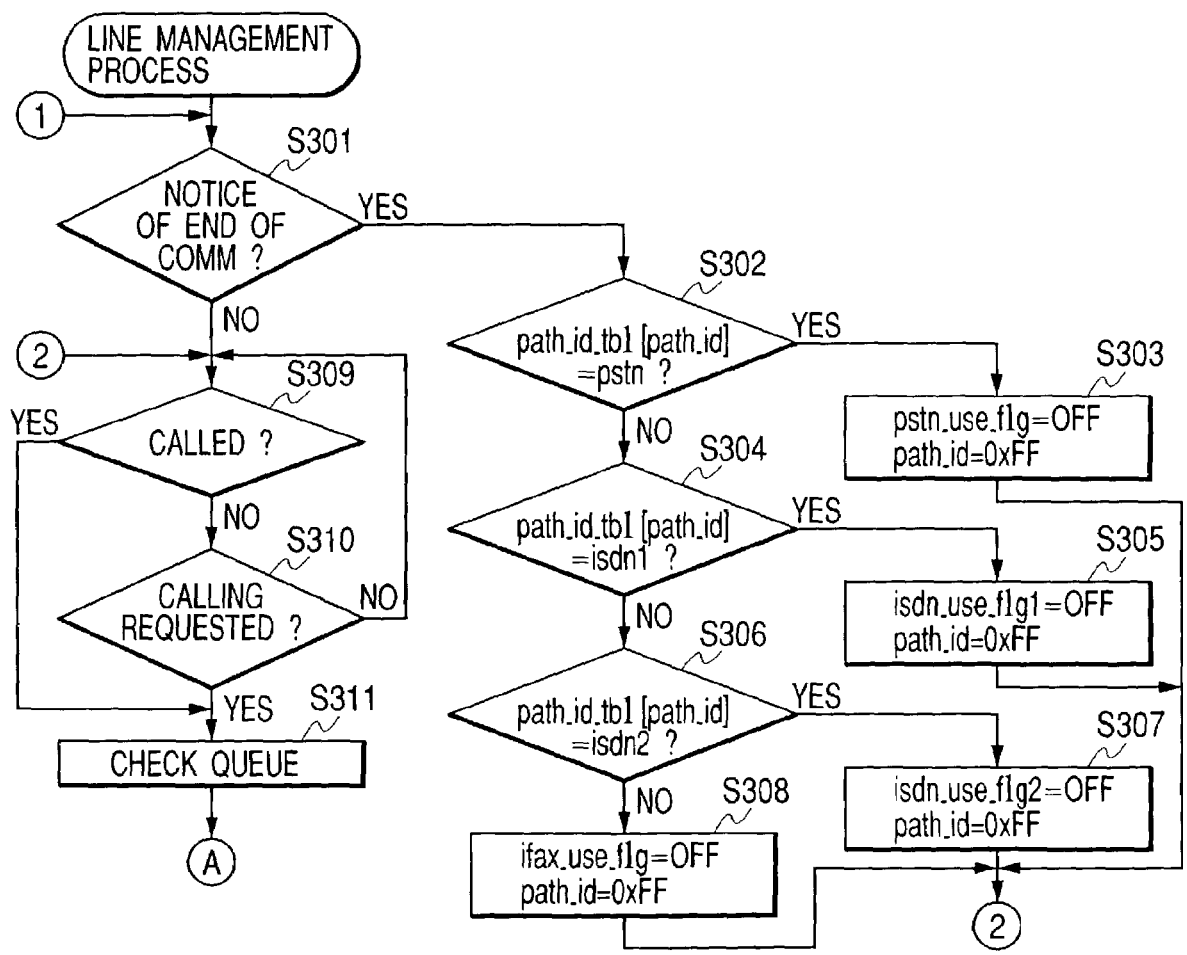

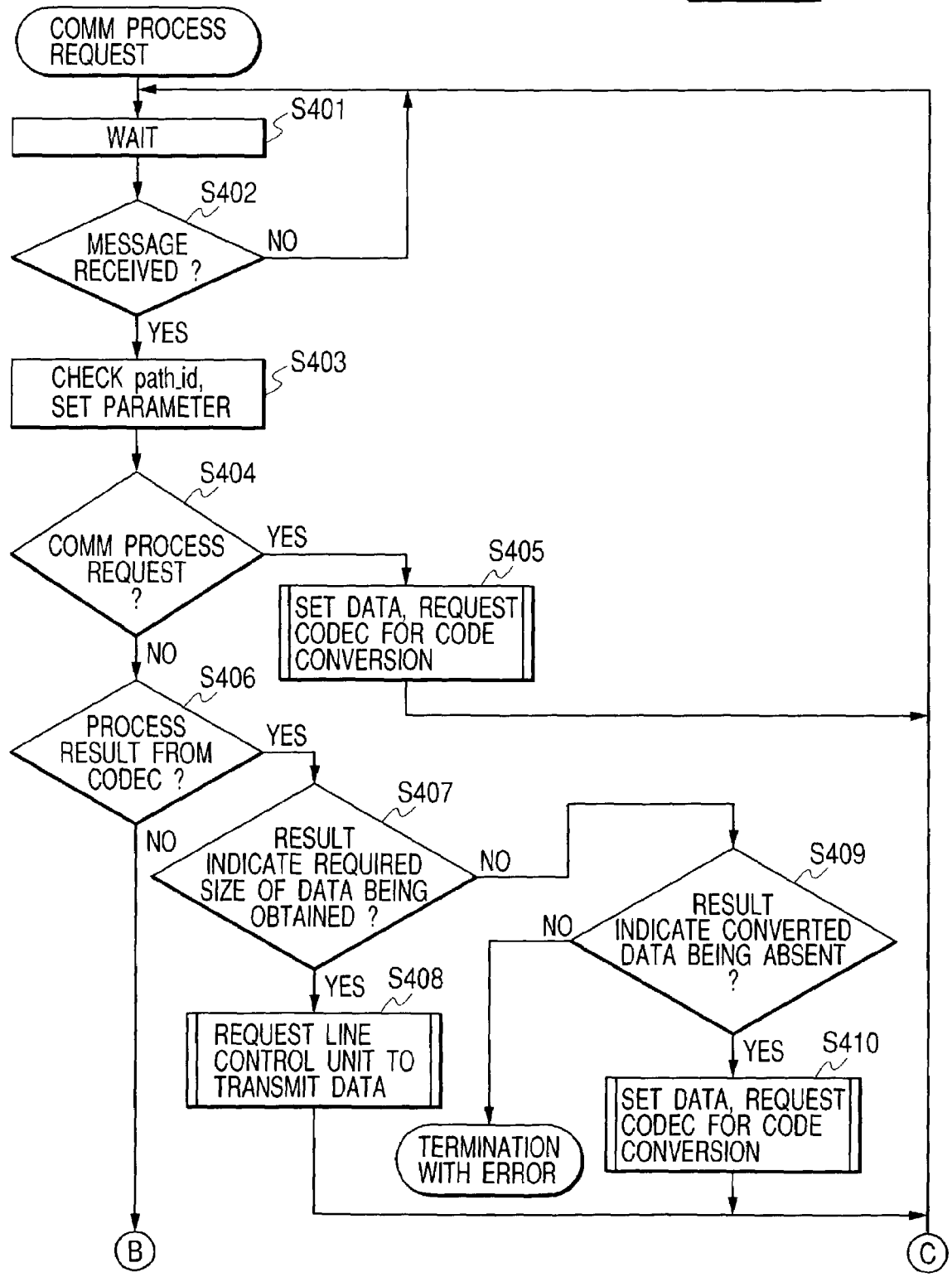

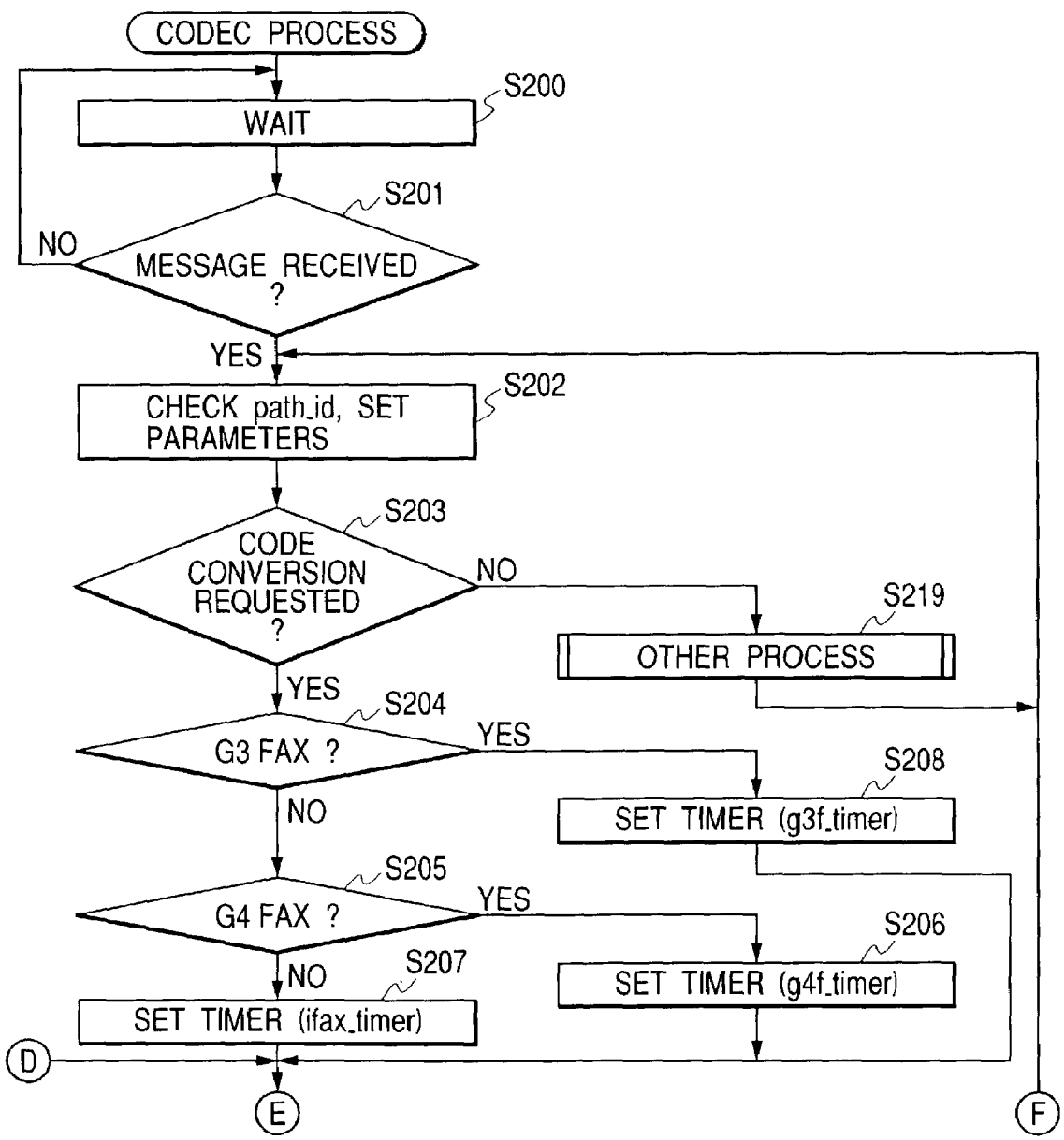

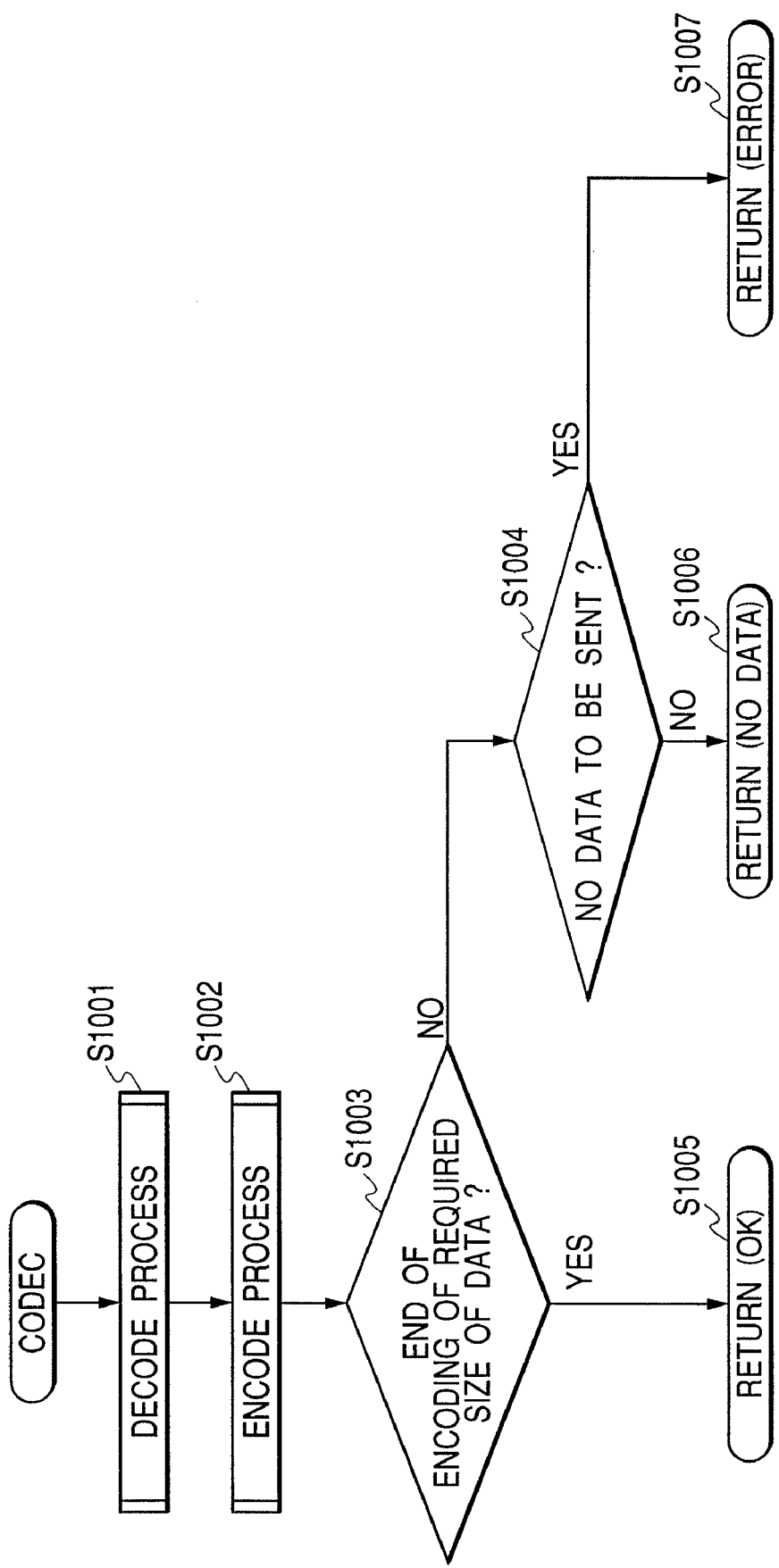

COMMUNICATION CONTROL TERMINAL APPARATUS, AND STORAGE MEDIUM

BACKGROUND OF THE INVENTION

1. Field of the Invention

The present invention relates to a communication control terminal apparatus for converting into code information that is to be communicated and for communicate the code, and a storage medium therefor.

2. Related Background Art

In the current information infrastructural society, even on the office machine market, it is natural that one composite machine having multiple functions is employed instead of conventional, standalone machines.

Especially, as for information communication functions, a variety of communication functions are provided for a single machine, including a function for facsimile communication using a telephone line or an ISDN line, a function for execute E-mail communication across a network and a printer/scanner function.

For example, one of the current composite digital machines can transmit documents received by E-mail to PCs, or to G3 facsimile machines or G4 facsimile machines at the same time by means of multi-address calling.

FIG. 9 is a flowchart showing a conventional CODEC operation.

When two or more communications are performed at the same time, however, the load imposed on a CPU is accordingly increased and the processing time is extended. Codec processing is an especially heavy load, and depending on the case, data can not be coded quickly.

When two or more communications are performed at the same time, and excessive time is required for the codec process for one communication, the other processes are adversely affected. Especially, when facsimile communication is employed, if predetermined code is not generated and transmitted onto a line within a period specified in the Recommendation, the connection is disconnected and normal communication can not be implemented.

Therefore, an apparatus for adjusting the decoding process units (the number of lines) to enable a multiplexing process is disclosed in Japanese Patent Laid-Open No. 2001-148788.

A processing time for one line varies considerably regarding the code such as JBIG, in which there are large differences in the compression rates in dependence upon data. The conventional example can not cope with the large differences.

To avoid this problem and increase the processing speed, it is an idea to mount a hardware CODEC or the like capable of performing high speed processing. However, this idea causes a demerit that costs is too great.

That is, in the communication terminal apparatus of the conventional example, one CPU can not control two or more communications having the same or different protocols to be performed at the same time without adversely affecting each other.

SUMMARY OF THE INVENTION

It is one object of the present invention to provide a communication control terminal apparatus that can employ one CPU to control two or more communications having the same or different protocols to be executed at the same time without adversely affecting each other, and a storage medium on which a program therefor is stored.

BRIEF DESCRIPTION OF THE DRAWINGS

FIG. 2 is a diagram showing operations performed by a program stored in a ROM 3 according to the embodiment;

FIGS. 3A, 3B, 3C, 3D, 3E and 3F are diagrams showing line management parameters in the embodiment;

FIG. 9 is a flowchart showing a conventional CODEC operation.

DETAILED DESCRIPTION OF THE PREFERRED EMBODIMENT

Figure 1:
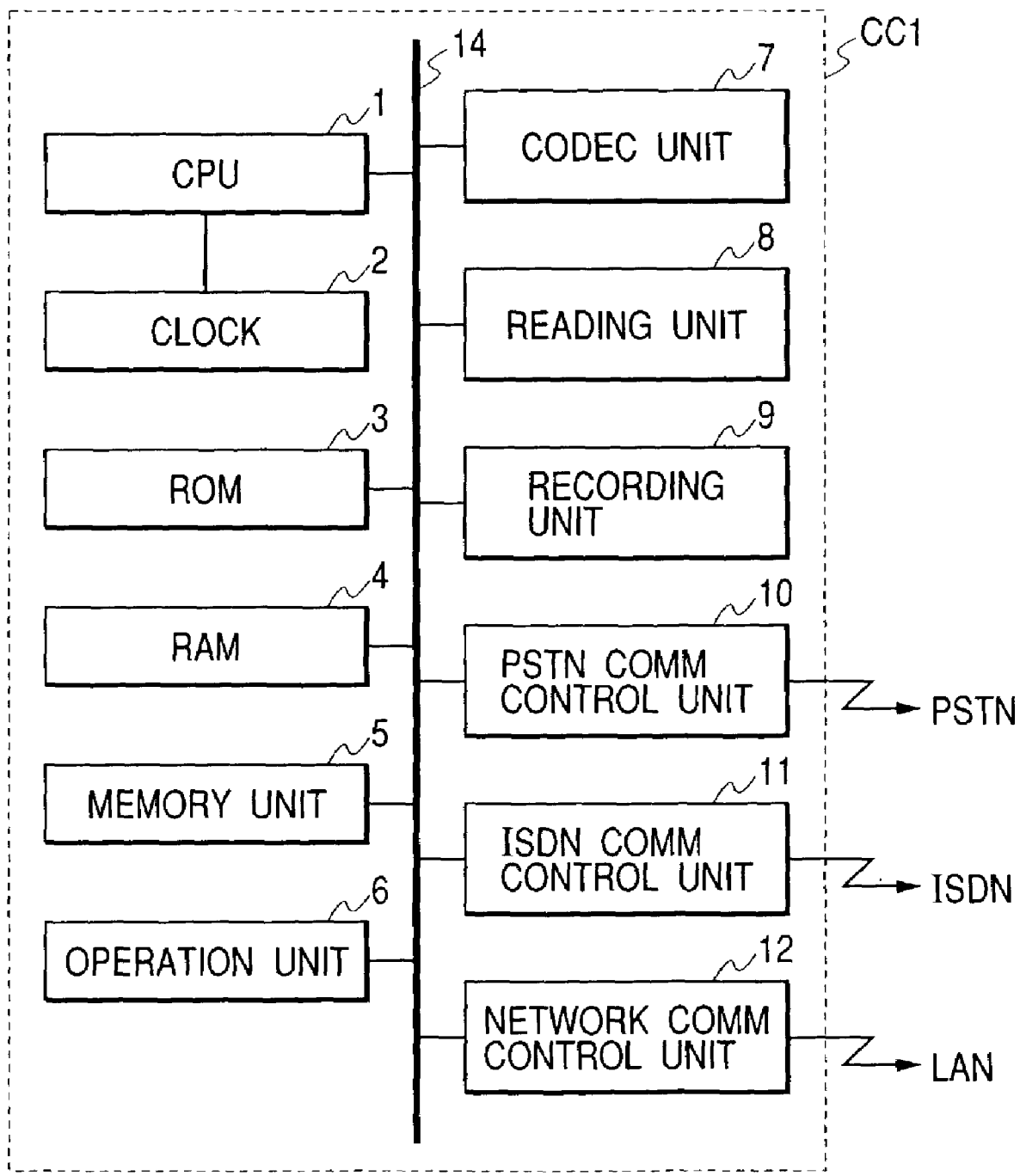
FIG. 1 is a block diagram showing a communication control terminal apparatus CC1 according to one embodiment of the present invention.

FIG. 1 is a block diagram showing a communication control terminal apparatus CC1 according to one embodiment of the present invention.

The communication control terminal apparatus CC1 can be connected to a PSTN line, an ISDN line and a LAN, and can perform G3FAX communication, G4FAX communication and iFAX communication at the same time.

The communication control terminal apparatus CC1 comprises: a CPU 1, a CLOCK 2, a ROM 3, a RAM 4, a memory unit 5, an operation unit 6, a codec unit 7, a reading unit 8, a recording unit 9, a PSTN communication control unit 10, an ISDN communication control unit 11, and a network communication control unit 12.

The CPU 1 is a system control unit that controls the entire apparatus. The CLOCK 2 is constituted by an IC, and measures the operation intervals (or counts clock pulses). The ROM 3 is a computer-readable storage medium used to store a computer-executable control program that is executed by the CPU 1 to cause the CPU 1 to perform a method of controlling the apparatus. And the RAM 4 is an SRAM for storing, for example, a program control variable, a registered setup value, device management data and work buffers.

The memory unit 5 is constituted by a DRAM for storing data such as image data. The operation unit 6 is constituted by a display unit and a keyboard, which an operator can manipulate to enter various instructions. The codec unit 7 codes and decodes information. The reading unit 8, which is constituted by a CS image sensor and a document feeding mechanism, optically reads a document and converts read data into electric image data. And the recording unit 9 records the image data or file data on a paper.

The PSTN communication control unit 10 is connected to the PSTN line and controls the entire communication via that line. The ISDN communication control unit 11 is connected to the ISDN line and controls the entire communication via that line. And the network communication control unit 12 is connected to a network, such as a LAN, and controls the entire network communication.

The operation performed by the embodiment will now be described.

FIG. 2 is a diagram showing operation performed by the program stored in the ROM 3 according to the embodiment.

First, an example of management of plural lines will be described.

FIGS. 3A to 3F are diagrams showing line management parameters for the embodiment.

The line management parameters are provided for each of the lines.

PSTN line management parameters are shown in FIG. 3A.

pstn_use_flg 611 is a flag indicating the usage state of a PSTN line. When the PSTN line is idle, the pstn_use_flg 611 is set to OFF, while when the PSTN communication is being conducted, the pstn_use_flg 611 is set to ON.

path_id 612 is a multi-communication control management ID that is provided for a communication being currently conducted. Each of the control units manages and controls the parameters based on the path_id.

Network management parameters are shown in FIG. 3B.

ifax_use_flg 621 is a flag indicating the iFAX communication state. The ifax_use_flg 621 is set to OFF when the iFAX communication is idle, while it is set to ON when the iFAX communication is being conducted.

path_id 622 is a multi-communication control management ID that is provided for a communication being currently conducted. Each of the control units manages and controls the parameters bases on the path_id.

FIGS. 3C and 3D are diagrams showing ISDN line management parameters.

isdn1_use_flg 631 and isdn2_use_flg 641 are flags indicating the respective usage states of the ISDN lines. Each of these flags 631 and 641 is set to OFF when the ISDN line is idle, while it is set to ON when the ISDN communication is currently conducted. The ISDN line management parameters are provided for each ISDN lines, and in this embodiment, since two ISDN lines are available, the ISDN line management parameter 1 and the ISDN line management parameter 2 are prepared.

Each of path_id 632 and path_id 642 is a multi-communication control management ID that is provided for a communication being currently conducted. Each of the control units manages and controls the parameters based on the path_ids.

FIG. 3E is a diagram showing a pathID. management table. The pathID. management table is a table wherein communications and path_ids are correlated, and a line type is stored in any of the path_ids 651 to 654 that are currently employed.

The path_ids 651 to 654 are used to manage two or more communication processes.

One path_id is allocated for one communication process. Message exchange and data transmission among the control units are performed based on the path_ids, and the messages/data having the same path_id relate to the same communication.

FIG. 3F is a diagram showing an example for managing a calling queue.

A calling job from the operation unit 6 by a user, or a calling job by a timer or by a transmission, is registered as a communication queue (com_queue), which will be described in detail at step S710 in FIG. 5, in the calling queue management table using a pointer.

The line management process according to the embodiment will now be described.

Figure 4B:
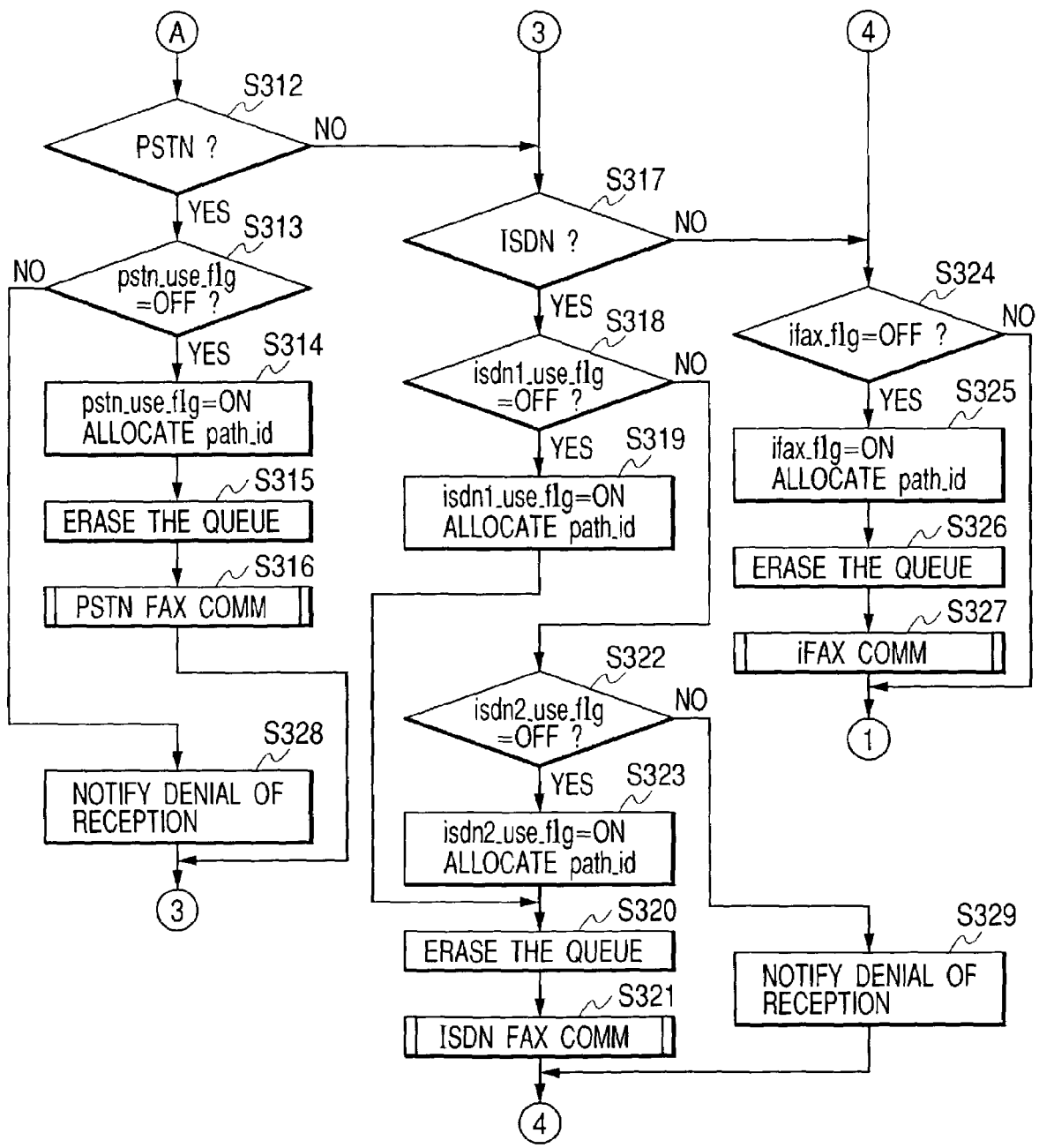
FIG. 4 is comprised of FIGS. 4A and 4B showing flowcharts of the line management processing in the embodiment.

FIG. 4 is comprised of FIGS. 4A and 4B showing flowcharts of the line management processing for the embodiment.

The line management processing is initiated by the CPU 1.

During the line management processing, a check is periodically performed to determine whether the state of a line has been changed (a communication has ended or a call has been received) and whether a calling request is issued (S301, S309 and S310).

When a calling queue is present in the calling queue management table in FIG. 3F (S310), the contents of the queue are examined (S311) and a line type (com_mode 712) is confirmed.

When the line type is the PSTN line (S312), a check is performed to determine whether or not the PSTN line is occupied. In this embodiment, it is ascertained that the pstn_use_flg 611 indicates that the line is busy (S313). When the pstn_use_flg is OFF, the pstn_use_flg is set to ON, and a path_id is allocated (S314). In the path_id management table in FIG. 3E, an unused number is employed as the path_id, and a corresponding line type is registered.

The same number is also registered for the path_id 612, which is the PSTN line management parameter in FIG. 3A.

The above calling queue is erased from the calling queue table in FIG. 3F (S315), and the queue is transmitted as a communication request to the PSTN communication control unit 10 (S316). Then, the next calling queue is examined.

When the pstn_use_flg 611 is ON (occupied), the communication queue is maintained in the table (S309), and the next calling queue is examined.

The same process is performed for the ISDN and the network lines (S317 to S327).

Since two communication operations are available via the ISDN line, two sets of line management parameters are employed.

When a call has arrived, the communication control unit for a corresponding line transmits a communication queue as a call arrival notification. When the notification is received (S309), the communication queue is examined (S311), and the line through which the notification has been issued is identified.

When a call has arrived via the PSTN line (S312), the pstn_use_flg 611 is examined. When the pstn_use flg is OFF (S313), the pstn_use flg 611 is set to ON, and a path_id is allocated (S314). The allocation of the path_id is performed in the same manner as for the calling. Then, the queue is transmitted as a communication process request to the PSTN communication control unit 10 (S316).

When the pstn_use_flg is ON, it is assumed that the line is occupied, and a message for denial of a call reception is transmitted to the PSTN control unit 10 (S328).

The same processing is performed for the ISDN and network communication (S317 to S327).

When a communication end notification is received via any line (any a specific communication control unit) (S301), a corresponding line is identified by referring to the path_id management table in FIG. 3E. When the communication end notification is identified to be received via the PSTN line (S302), the pstn_use_flg 611 is set to OFF (S303). The same process is performed for the ISDN line and the network (S304 to S308).

An example of data processing during the communication process will now be described for this embodiment.

Figure 5:
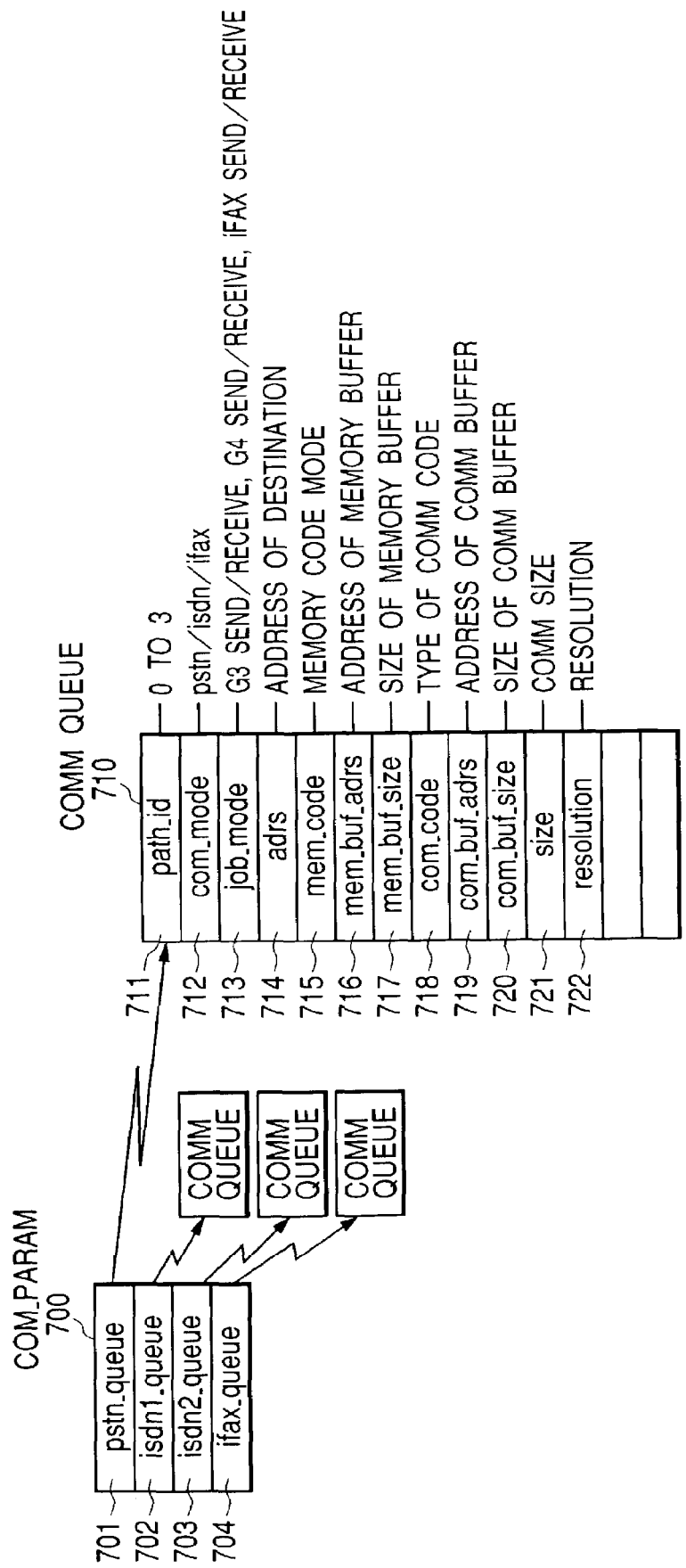
FIG. 5 is a diagram showing an example of the parameter management in a communication control unit according to the embodiment.

FIG. 5 is a diagram showing example parameter management for the communication control unit according to the embodiment.

The data processing performed during the communication process is controlled by the CPU 1. The parameters required for communication are transmitted as communication queues to the individual communication control units. As an example, a communication queue 710 includes the following parameters.

path_id 711 is a communication management parameter, com_mode 712 is a parameter indicating a line type, and job_mode 713 indicates an operation type, such as calling, call arrival and transmission/reception.

adrs 714 is a parameter that includes address information of a communication destination. mem_code 715 is a parameter indicating a code mode for storage when data is stored in the memory unit 5, and the MH/MR/JBIG/TEXT value or the like is entered. mom_buf_adrs 716 is a parameter indicating an address of a memory buffer.

mem_buf-size 717 is a parameter indicating the size of mem_buf_adrs 716. com_code 718 is a parameter representing a data coding mode during the communication process, and the MH/MR/JBIG/TEXT value or the like is entered.

com_buf_adrs 719 is a parameter representing an address of a communication buffer. com_buf_size 720 is a parameter indicating the size of the communication buffer.

size 721 is a parameter indicating the size of image data, and A4/B4/A3 or the like is entered. resolution 722 is a parameter indicating the resolution of image data.

The data processing performed by the CPU 1 during the communication process will now be described. This data processing performed by the CPU 1 is initiated upon the reception of a message from each communication control unit.

An explanation will now be given for an example of the data processing performed by the CPU 1 during the communication process when a transmission request is received by the PSTN communication control unit 10.

Figure 6B:
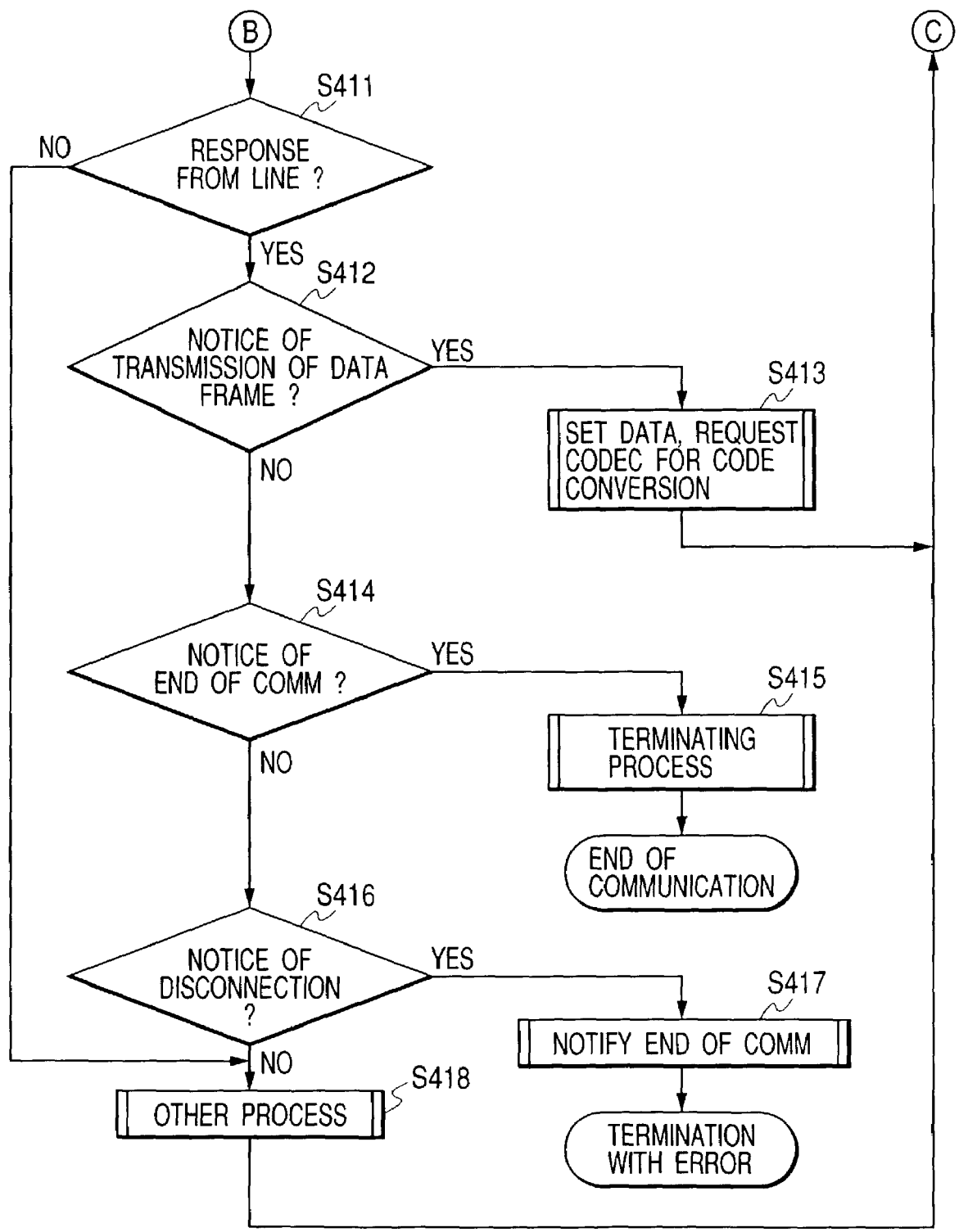
FIG. 6 is comprised of FIGS. 6A and 6B showing flowcharts of the processing performed when a transmission request is received by a PSTN communication control unit according to the embodiment.

FIG. 6 is comprised of FIGS. 6A and 6B showing flowcharts of the data processing performed, according to this embodiment, by the CPU 1 during the communication process when a transmission request is received by the PSTN communication control unit 10.

When a message is received (S402), the contents of the message are examined (S403). And when the message is a communication process request, the mem_buf_adrs 716 and the mem_buf_size 717 are set in accordance with the contents of the communication queue 710, and a request for converting code for storage into code for communication is transmitted to the codec unit 7 (S405). The CPU 1 then enters the next message waiting state.

When a process result notification is received from the codec unit 7 (S406), the results are examined.

When the results indicate that a desired code has been prepared (S407), this code is transmitted (S408).

When the results indicate that no converted data is present, the mem_buf_adrs 716 and the mem_buf_size 717 are again set as next data for conversion, and a code conversion request is again output to the codec unit 7 (S410). The CPU 1 then enters the next message waiting state.

When a response message is received from the PSTN communication control unit 10 (S411), the contents of the message are examined. And when the message is a data transmission notification (S412), the next code conversion request is transmitted to the codec unit 7 (S413). Whereas when the message is a communication end notification (S414), a terminating process is performed (S415) and the processing is terminated. When the message is a disconnection notification (a disconnection due to malfunction in a partner machine, a line barrier or no response), the terminating process is also performed (S416) and the communication process is terminated. The other messages are handled as other processes.

The same processing is performed for the operation when a call has arrived.

Further, the operation of the ISDN/network communication control unit is also performed in the same manner.

The data processing during communication by the CPU 1 can be conducted as multi-function by switching the message waiting status and the message process status, so that two or more communications can be simultaneously performed.

The processing performed by the codec unit 7 for this embodiment will now be described.

Figure 7:
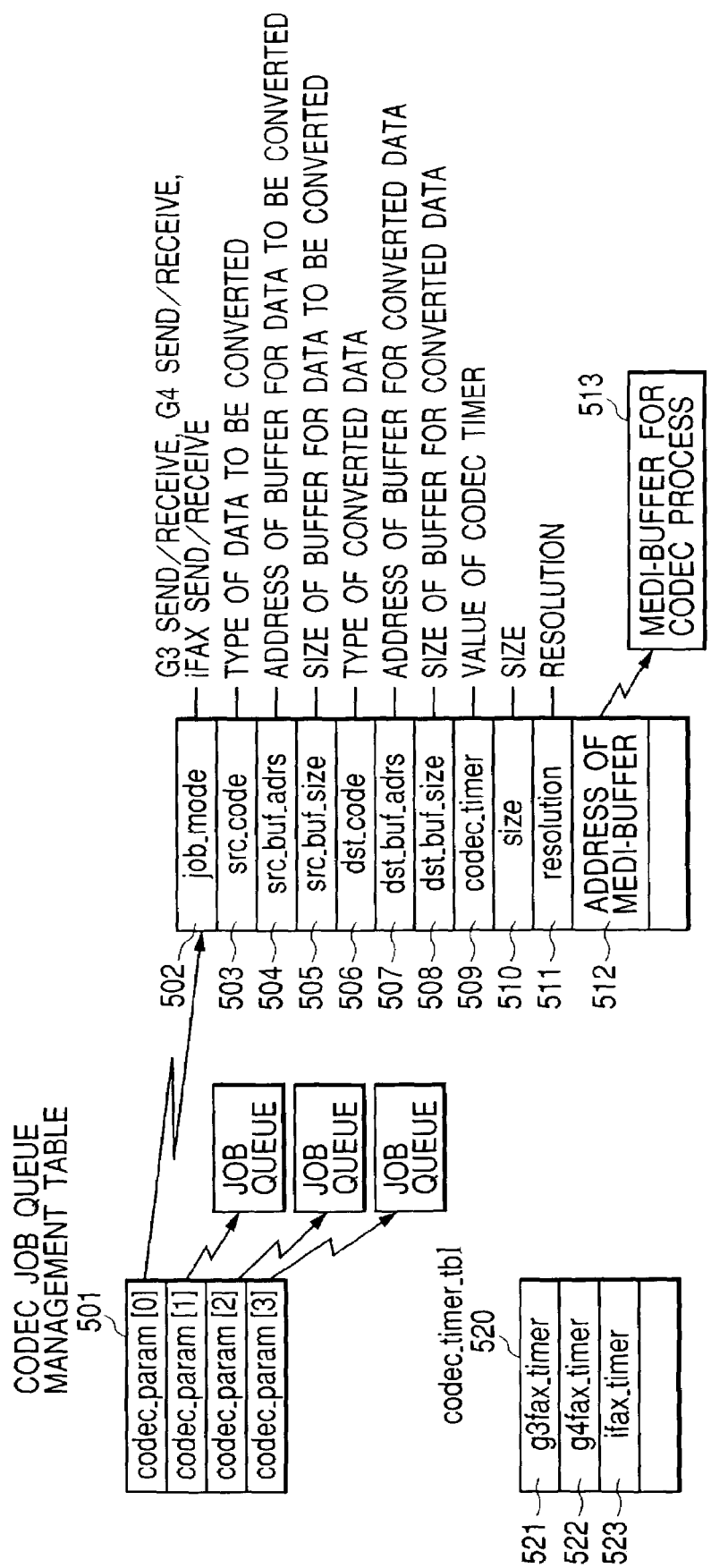
FIG. 7 is a diagram showing an example of CODEC process parameters in the embodiment.

FIG. 7 is a diagram showing an example of codec processing parameters according to this embodiment.

The codec unit 7 serves for each communication one-to-one. The individual processes are managed by using the path ids shown in FIG. 5, and processing parameters are provided for each path_id.

job_mode 502 indicates a communication type, and a value for a G4 transmission, G4 reception or the like is entered. src_code 503 indicates the type of code to be converted, and the MH/MR/JBIG/TEXT value or the like is entered. At the time of transmission, it is a code for storage, while at the time of reception, it is a code for communication.

src_buf_adrs 504 indicates a buffer address for storing the code to be converted. src_buf_size 505 indicates the size of src_buf_adrs 504. dst_code 506 indicates the type of converted code, and the MH/MR/JBIG/TEXT value is entered. At the time of transmission, it is a code for communication, while at the time of reception, it is a code for storage.

dst_buf_adrs 507 indicates a buffer address for storing the converted code. dst_buf_size 508 indicates the size of dst_buf_size 507. codec_timer 509 indicates a value of a codec timer. The timer value represents a continuous operation permission time in the codec process shown in FIGS. 8A and 8B. The value of the codec_timer 509 is determined in accordance with the communication type indicted in job_mode 502.

size 510 indicates the size for image communication, and the A4/B4/A3 value or the like is entered. resolution 511 indicates the resolution for image communication. A medibuffer address 512 is an address of a medi-buffer 513 being a buffer for codec processing.

An operation timer of the codec unit 7 for each communication type is registered in codec_timer_tbl 520. A value of the operation timer of the codec unit 7 in G4 communication is registered in g3fax_timer 521. A value of the operation timer of the codec unit 7 in G4 communication is registered in g4fax_timer 522. A value of the operation timer of the codec unit 7 in iFAX communication is registered in ifax_timer 523.

An example of the operation for the codec unit 7 according to this embodiment will now be described.

Figure 8B:
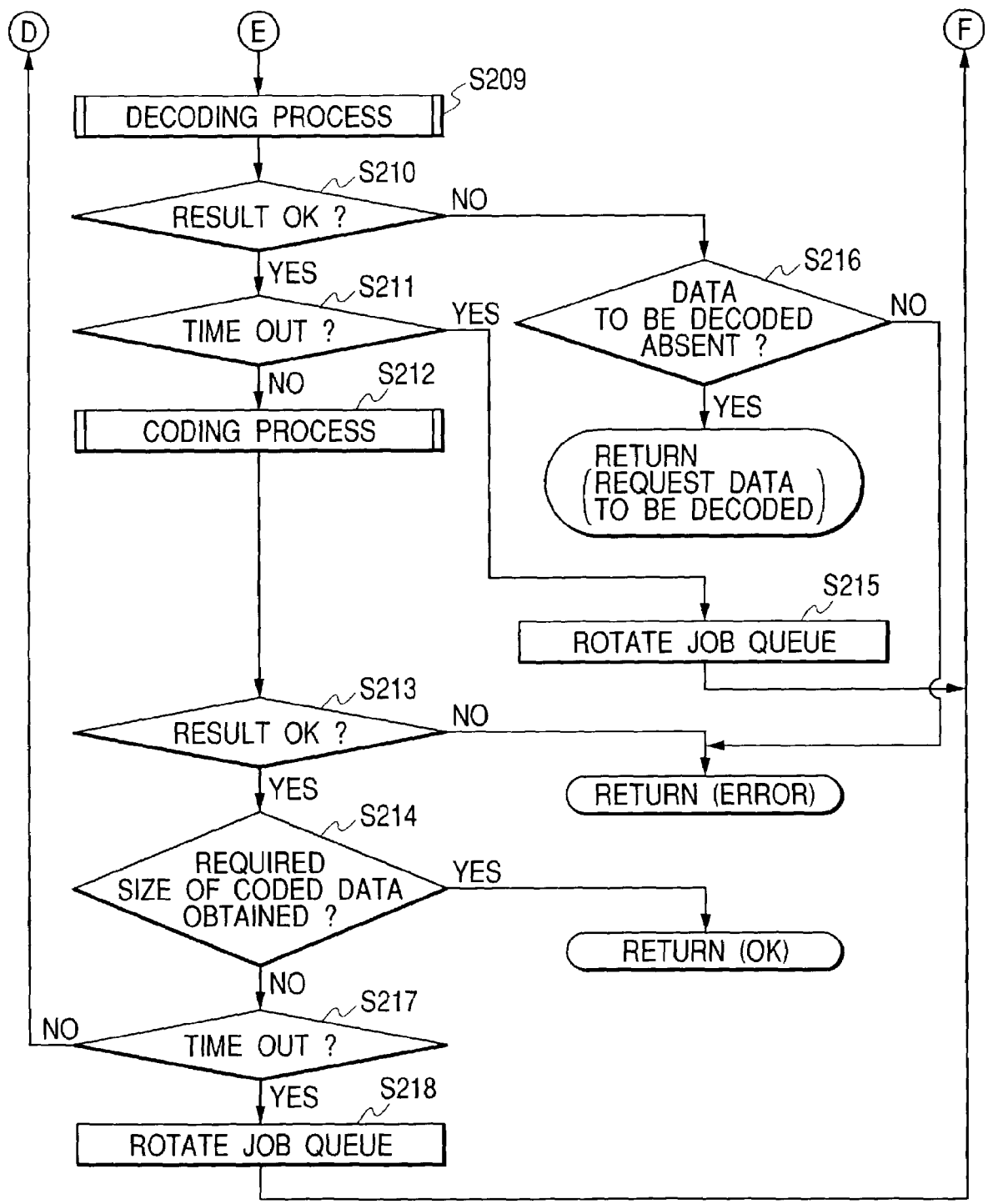
FIG. 8 is comprised of FIGS. 8A and 8B showing flowcharts of the processing performed by the codec unit according to the embodiment.

FIG. 8 is comprised of FIGS. 8A and 8B showing flowcharts of the operation of the codec unit 7 according to the embodiment.

As well as the communication control units, the codec unit 7 enters the operating state upon receiving a message from each processing unit.

Upon the reception of the message, the codec unit 7 examines the contents of the message, and in accordance with path_id, registers parameters in the codec_param 501 (S202).

When the message is a code conversion request from the communication control unit (S203), the codec unit 7 identifies the communication type based on job_mode 502.

When the communication type is a G3 communication, the codec unit 7 sets the value of the g3fax_timer 521 in the codec_timer_tbl 520 in the codec_timer 509 corresponding to the codec_param. When the communication type is a G4 communication or an iFAX communication, the codec unit 7 also sets the value of the g4fax_timer 522 or the ifax_timer 523 in the codec_timer 509.

Generally, for data communication, a predetermined amount of code data must be transmitted to a line within a period specified by a communication protocol, and this specification differs depending on the protocol. To perform two or more communications at the same time, if the period for one communication is prolonged, this affects the other communication operation, and when code data is not transmitted to a line within a predetermined time period, the line may be disconnected by a communication partner. Therefore, for the CODEC processing, which is an especially heavy task that imposes a great load on the CPU 1 to perform multiple processes at the same time, an operating time within a period that does not affect another communication is set for the codec_timer.

That is, when a protocol of which the regulations on the operation time are strict, a relatively long operating time is set for the codec_timer. But when a protocol of which the regulations are not strict, a relatively short operating time is set for the codec_timer.

Many methods can be employed to set the value for the codec_timer_tbl 520. This value may be set as an apparatus initialization value, in accordance with the communication protocol and the processing capability of the terminal, or it may be set through an operation.

When the timer is set, the processing (the coding process and the decoding process) is begun. Generally, the codec unit 7 decodes target code to obtain intermediate code, and then converts the intermediate code into a predetermined code.

First, the decoding process is performed (S209) and the decoded data is temporarily stored in the medi-buffer 513. The decoding results are examined (S210), and when the results indicate there is no data to be decoded (S216), a request for data to be decoded is issued to the communication control unit. The processing is thereafter terminated.

When the decoding results indicate that the process for the medi-buffer has been completed, the codec_timer 509 is examined (S211). And when the operating time has not expired, the conversion of the intermediate code is begin (S212) for a buffer for converted code.

When the operating time has expired, it is assumed that the processing time allocated for one communication has elapsed, and the job is rotated to a queue to be processed that is registered in the codec_param 501 (S215). The flow then returns to the start of the codec process (S202).

When the results indicate that the amount of code designated in the dst_buf_size 508 has been processed (S214), the codec unit 7 transmits a code completion notification to the communication control unit. The processing is thereafter terminated.

When the results indicate that the amount of code designated in the dst_buf_size 508 has not yet been processed, the codec_timer 509 is examined (S217). And when the operating time has not yet expired, the flow returns to the decoding process (S209).

When the operating time has expired, as in the decoding process, the job is rotated to a queue to be processed that is registered in the codec_param 501 (S218). The flow then returns to the start of the processing (S202). The codec unit 7 can resume the process in the communication newly designated by queue rotation, with the state whereat the previous process was terminated by queue rotation.

When only one communication is currently performed, only one codec job queue is present. Then, since the process is returned naturally to the same queue by queue rotation, the processing can be conducted by switching-over adequate for the number of communications.

According to the embodiment, the codec unit 7 has timers for setting the period of time for the processing in accordance with respective communication types, and changes the process queue each time the timer period has elapsed. Thus, the processing time is not solely spent to perform one communication, and efficient multiplex communication is enabled.

Furthermore, according to the embodiment, since the execution time for the codec unit 7 is appropriately designated by setting the timer value, any type of communication protocol can be coped with, and a flexible and efficient multiplex communication system can be designed.

Further, according to the embodiment, since high-speed hardware is not required, the costs can be effectively reduced.

As is described above, according to the embodiment, there is provided the communication control terminal apparatus comprises: means for storing information by using predetermined code; codec means for decoding or coding the information; and two or more communication control means for communicating the information, wherein code for communication converted by the codec means is transmitted via the communication control means. Since the execution time for the codec means is changed in accordance with the communication procedures performed by the communication control means, communications to be conducted using the same or different protocols, can be controlled by a single CPU of the communication control terminal apparatus, so that these communications do not adversely affect each other.

According to the embodiment, two or more communications to be conducted using the same or different protocols, can be controlled by a single CPU of the communication control terminal apparatus, so that these communications do not adversely affect each other.

What is claimed is:

1. A communication control terminal apparatus comprising:
    a codec unit that performs coding operations;
    a plurality of communication units, each communication unit performing a communication procedure that corresponds to a communication type;
    a management unit for managing management information including a plurality of communication types of a plurality of communication procedures performed by the communication units;
    a storage unit for storing a plurality of timer values indicating a plurality of periods of time during which said codec unit can perform coding operations for each type of communication procedure, each timer value corresponding to one of the communication types; and
    a rotation unit for rotating the coding operations performed by said codec unit among two or more the communication procedures, based on the management information managed by said management unit, and for varying an operation time of said codec unit, based on a communication type and a corresponding timer value stored in said storage unit,
    wherein, if a designated amount of code is determined to have been processed by said codec unit for one of the two or more communication procedures, said rotation unit terminates rotating the coding operations performed by said codec unit for the one of the two or more communication procedures.

2. The communication control terminal apparatus according to claim 1, wherein the timer values are set for each communication type, based on a value of a disconnection timer for terminating a corresponding communication.

3. The communication control terminal apparatus according to claim 1, wherein, when the operation time of said codec unit has elapsed, said codec unit executes an exchanged codec process for another communication procedure.

4. The communication control terminal apparatus according to claim 3, wherein said codec unit resumes the exchanged process at a state whereat the process was previously terminated.

5. The communication control terminal apparatus according to claim 3, wherein, when only one communication procedure is performed, the operating time of said codec unit is not changed.

6. A communication control method performed by a communication control terminal apparatus that includes a codec unit that performs coding operations, the method comprising:
   coding information;
   communicating the information by performing a plurality of communication procedures, each communication procedure corresponding to a communication type;
   managing management information including a plurality of communication types of a plurality of communication procedures performed;
   storing a plurality of timer values indicating a plurality of periods of time during which the codec unit of the communication control apparatus can perform coding operations for each type of communication procedure, each timer value corresponding to one of the communication types; and
   rotating the coding operations performed by said codec unit among two or more the communication procedures, based on the management information; and
   varying an operation time of the codec unit, based on a communication type and a corresponding timer value,
   wherein, if a designated amount of code is determined to have been processed by the codec unit for one of the two or more communication procedures, the rotating of the coding operations performed by the codec unit is terminated for the one of the two or more communication procedures.

7. The communication control method according to claim 6, wherein the timer values are set for each communication type, based on a value of a disconnection timer for terminating a corresponding communication procedure.

8. The communication control method according to claim 6, wherein, when the operation time of the codec unit has elapsed, an executed codec process for another communication procedure is executed.

9. The communication control method according to claim 8, wherein an exchanged process is resumed at a state whereat the process was previously terminated.

10. The communication control method according to claim 8, wherein, when only one communication procedure is performed, the operation time of the codec unit is not changed.

11. A computer-readable storage medium storing a computer-executable program that, when executed by a processor, causes the processor to perform a communication control method of a communication control terminal apparatus that includes a codec unit that performs coding operations, said method comprising:
   communicating information by performing a plurality of communication procedures, each communication procedure corresponding to a communication type;
   coding the information;
   managing management information including a plurality of communication types of a plurality of communication procedures performed;
   storing a plurality of timer values indicating a plurality of periods of time during which the codec unit can perform coding operations for each type of communication procedure, each timer value corresponding to one of the communication types;
   rotating the coding operations performed by said codec unit among two or more the communication procedures, based on the management information; and
   varying an operation time of the codec unit, based on a communication type and a corresponding timer value,
   wherein, if a designated amount of code is determined to have been processed by the codec unit for one of the two or more communication procedures, the rotating of the coding operations performed by the codec unit is terminated for the one of the two or more communication procedures.

* * * * *